(12) United States Patent
Shih

(10) Patent No.: US 6,616,021 B1
(45) Date of Patent: Sep. 9, 2003

(54) FRAME FOR HOLDING A BEVERAGE CONTAINER ON A BICYCLE

(75) Inventor: He-Jen Shih, Changhua Hsien (TW)

(73) Assignee: Nuvo Enterprise Co., Ltd., Changhua Hsien (TW)

( * ) Notice: Subject to any disclaimer, the term of this patent is extended or adjusted under 35 U.S.C. 154(b) by 0 days.

(21) Appl. No.: 10/160,079

(22) Filed: Jun. 3, 2002

(51) Int. Cl.[7] ............................................... B62J 11/00
(52) U.S. Cl. ....................... 224/414; 224/425; 224/926
(58) Field of Search ................................. 224/414, 425, 224/443, 457, 926

(56) References Cited

U.S. PATENT DOCUMENTS

| | | | | |
|---|---|---|---|---|
| 4,009,810 A | * | 3/1977 | Shook | 224/414 |
| 4,386,721 A | * | 6/1983 | Shimano | 224/425 |
| 5,301,858 A | * | 4/1994 | Hollander | 224/414 |
| 5,392,971 A | * | 2/1995 | Hsu | 224/414 |
| 5,704,525 A | * | 1/1998 | Barro | 224/926 |
| 5,839,632 A | * | 11/1998 | Koday | 224/443 |
| 6,216,929 B1 | * | 4/2001 | Bonard et al. | 224/443 |
| 6,401,997 B1 | * | 6/2002 | Smerdon, Jr. | 224/414 |
| 6,543,660 B2 | * | 4/2003 | Young et al. | 224/425 |

* cited by examiner

Primary Examiner—Gary E. Elkins
(74) Attorney, Agent, or Firm—Harrison & Egbert

(57) ABSTRACT

A frame is mounted on a bicycle frame to hold a beverage container and is formed of a fastening seat and a container holder. The fastening seat is fastened to the bicycle frame. The container holder is movably fastened to the fastening seat. When the container holder is forced to move by an external force, the beverage container can be removed from a confining portion of the container holder.

2 Claims, 7 Drawing Sheets

FRAME FOR HOLDING A BEVERAGE CONTAINER ON A BICYCLE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

1. Field of the Invention

The present invention relates generally to a bicycle accessory, and more particularly to a frame for holding a beverage container on the bicycle.

2. Background of the Invention

As shown in FIG. 1, a bicycle 10 comprises a seat 11, two tubes 12 and 13, and a shock absorber 14, which are located under the seat 11. A beverage container 40 is held to the tube 13 by a retaining piece 20 and a container holder 30. The beverage container 40 cannot be easily reached by a bicyclist.

BRIEF SUMMARY OF THE INVENTION

The primary objective of the present invention is to provide a bicycle with a frame for holding a beverage container in such a manner that the beverage container can be easily reached by a bicyclist.

The features and the advantages of the present invention will be readily understood upon a thoughtful deliberation of the following detailed description of the present invention with reference to the accompanying drawings.

DETAILED DESCRIPTION OF THE INVENTION

As shown in FIGS. 2–7, a beverage container frame "A" of the present invention is formed of a fastening seat 20 and a container holder 30.

Figure 1:
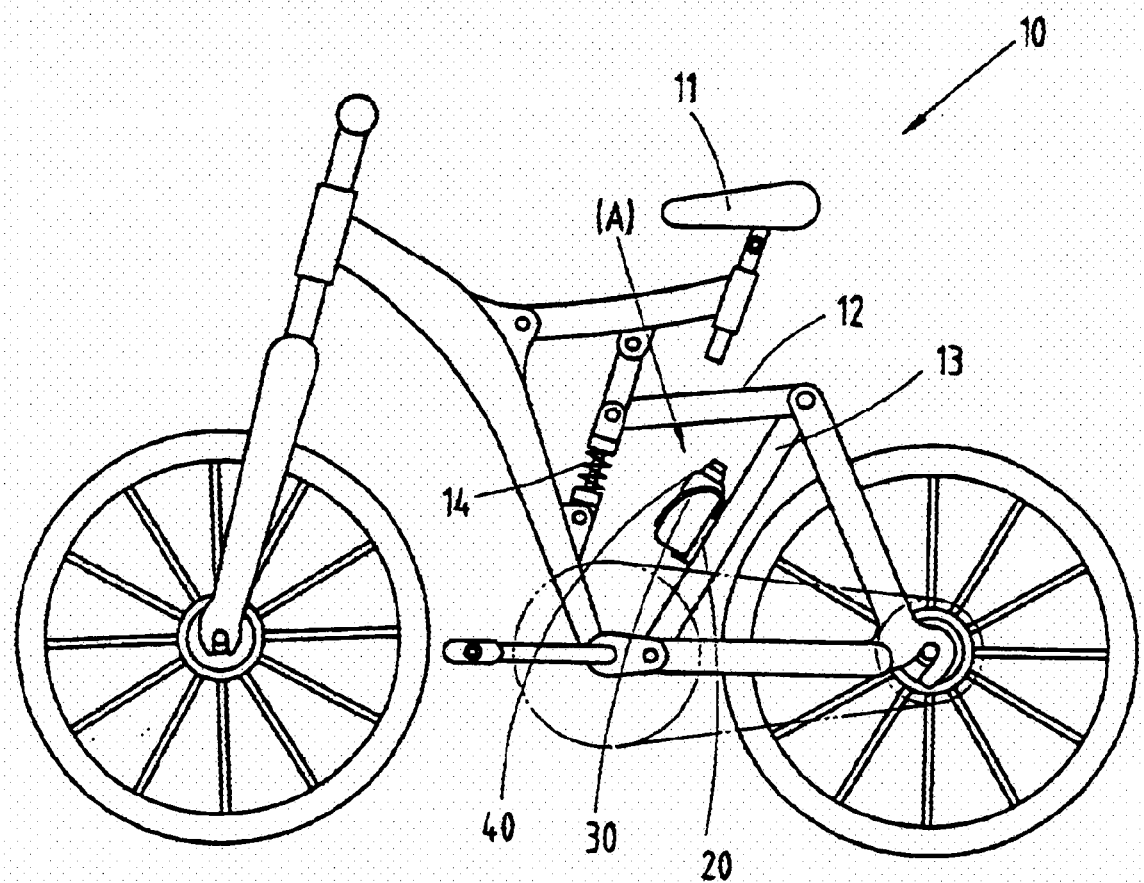
FIG. 1 shows a schematic view of a prior art beverage container holding frame of the bicycle.
Figure 2:
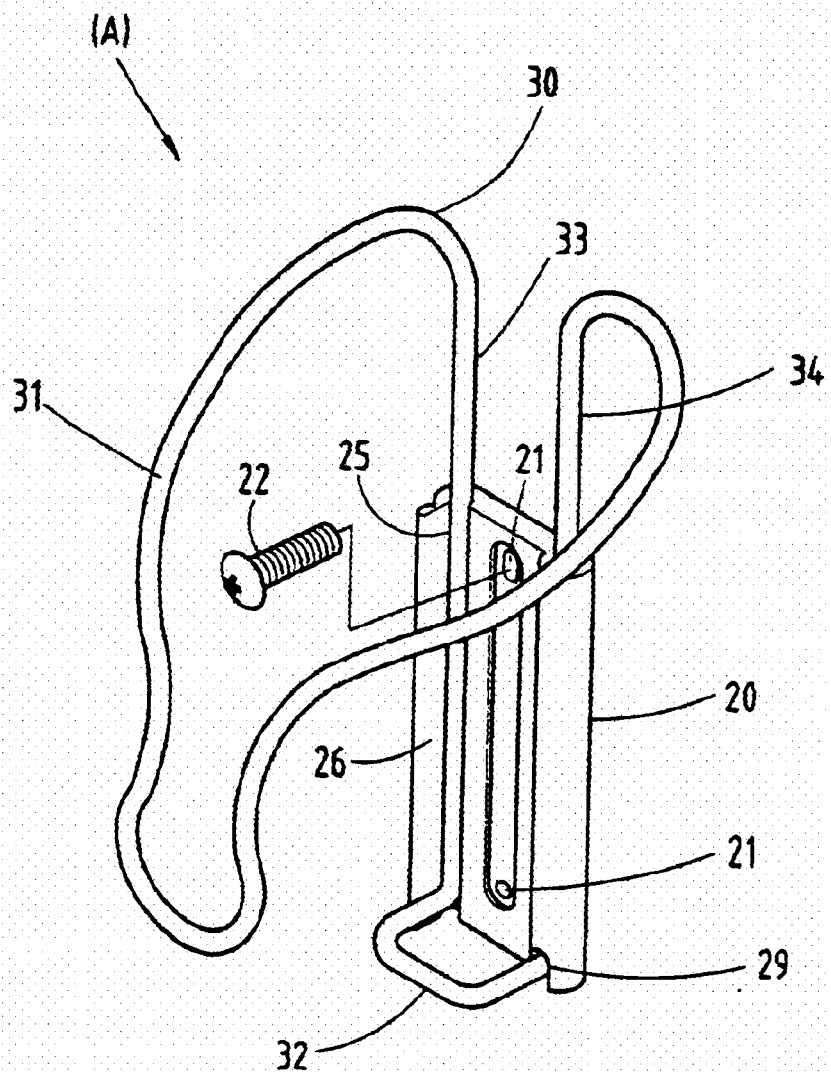
FIG. 2 shows a perspective view of the present invention.
Figure 3:
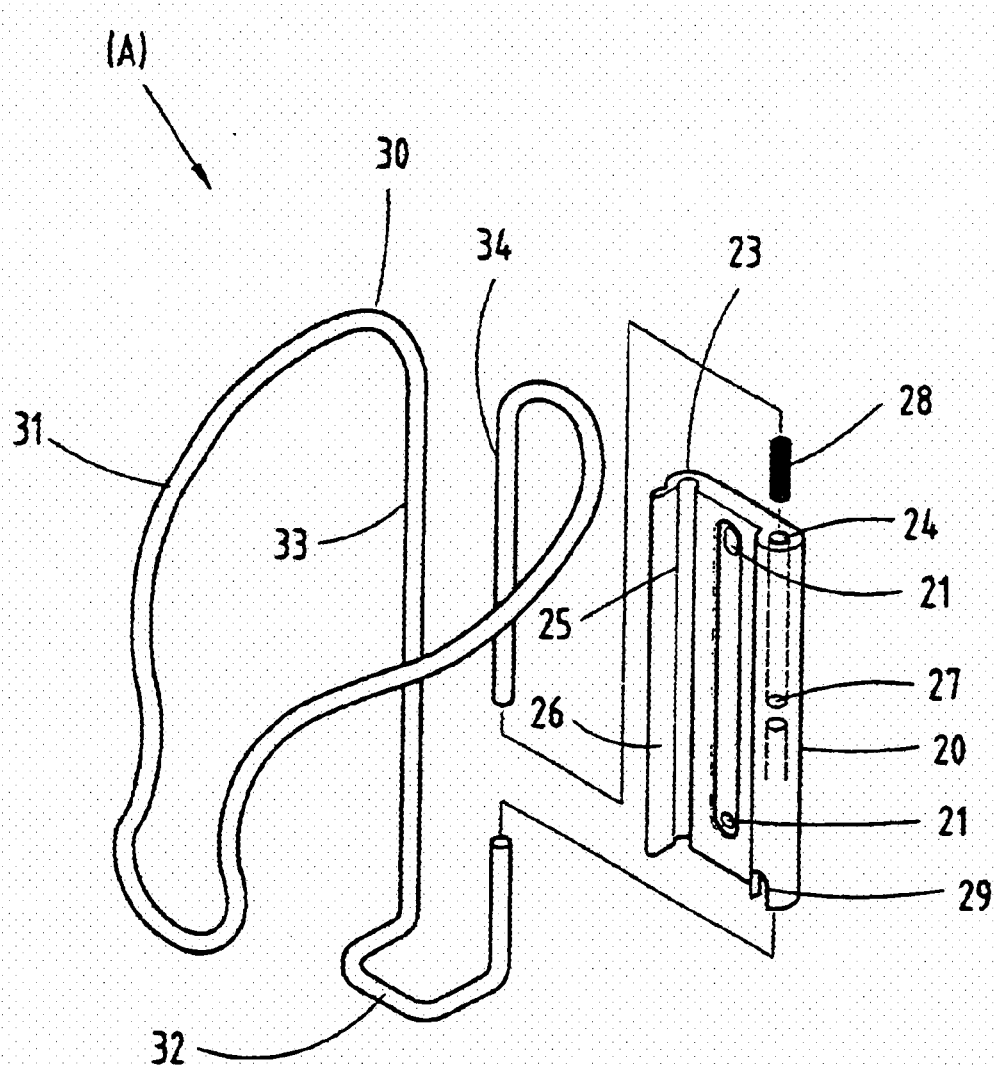
FIG. 3 shows an exploded perspective view of the tree present invention.
Figure 4:
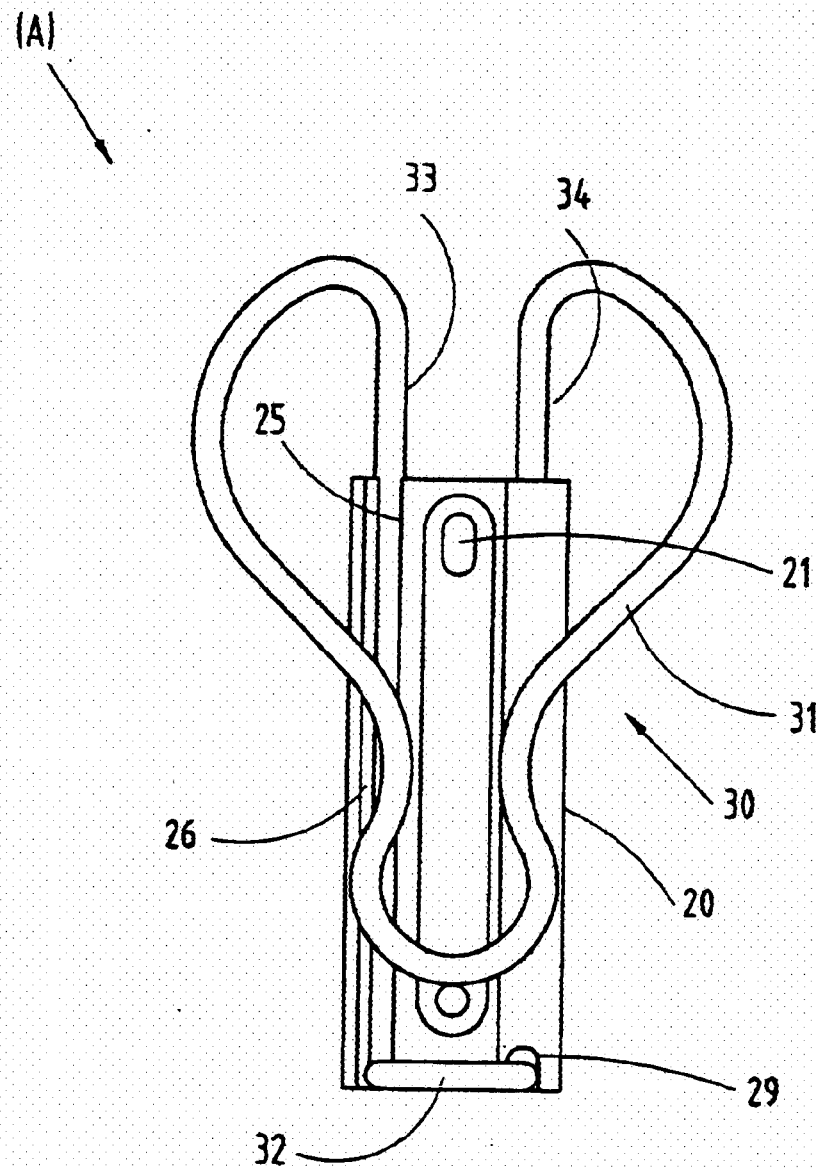
FIG. 4 shows a side view of the present invention.
Figure 5:
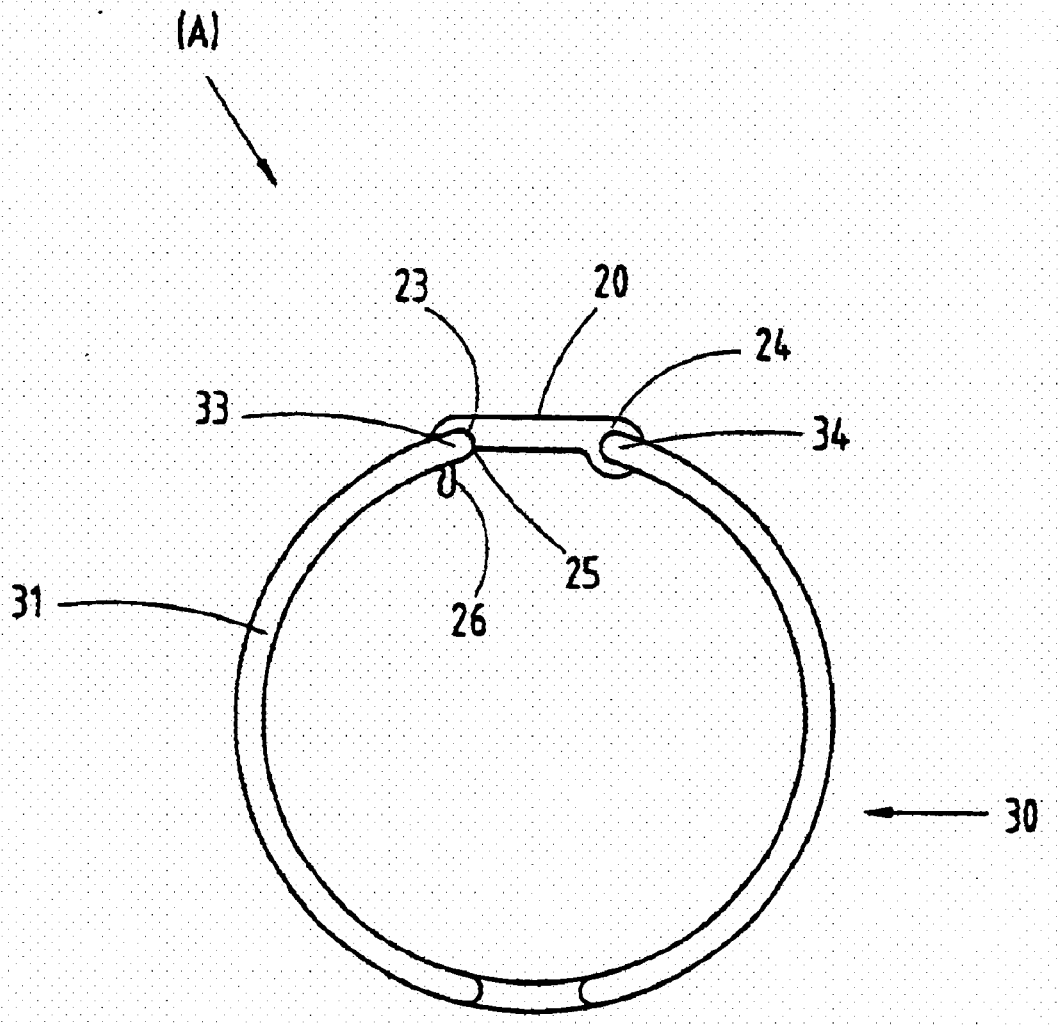
FIG. 5 shows a top plan view of the present invention.

The fastening seat 20 is provided with a fastening hole 21 and is fastened with the down tube 13 of the bicycle 10, as shown in FIG. 1, by a fastening bolt 22 which is put through the fastening hole 21. The fastening seat 20 is provided with a first receiving slot 23 and a second receiving slot 24, which are used to receive the container holder 30. The container holder 30 is formed of a confining portion 31, a base 32, a first side portion 33, and a second side portion 34.

The first receiving slot 23 of the fastening seat 20 is provided with an opening 25 and a retaining edge 26 extending along the opening 25. The first side portion 33 is received in the first receiving slot 23 such that the first side portion 33 is retained by the retaining edge 26. The second receiving slot 24 is provided with a stop edge 27, an elastic element 28, and a retaining slot 29. The retaining slot 29 is used to locate the base 32 of the container holder 30 in conjunction with the elastic element 28.

Figure 6:
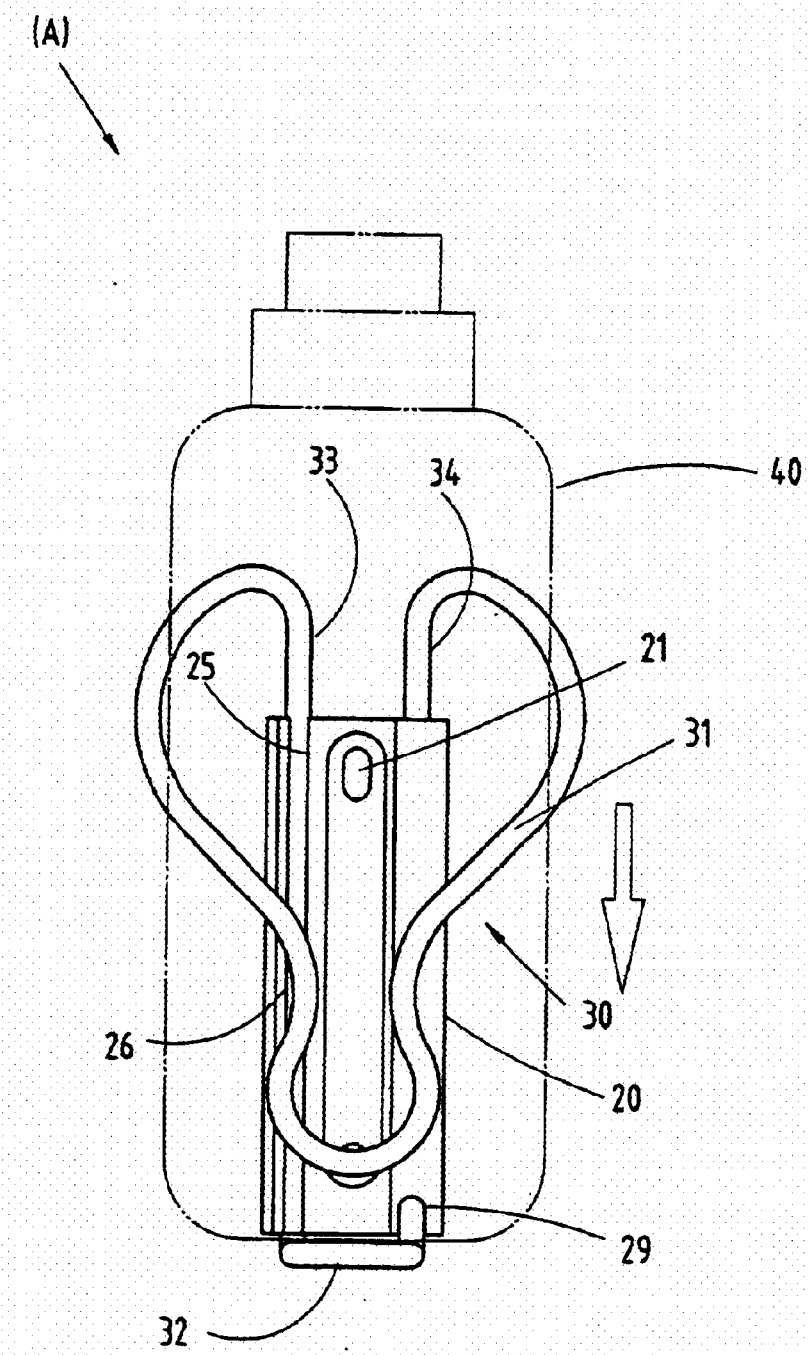
FIG. 6 shows a schematic view of the present invention in action.
Figure 7:
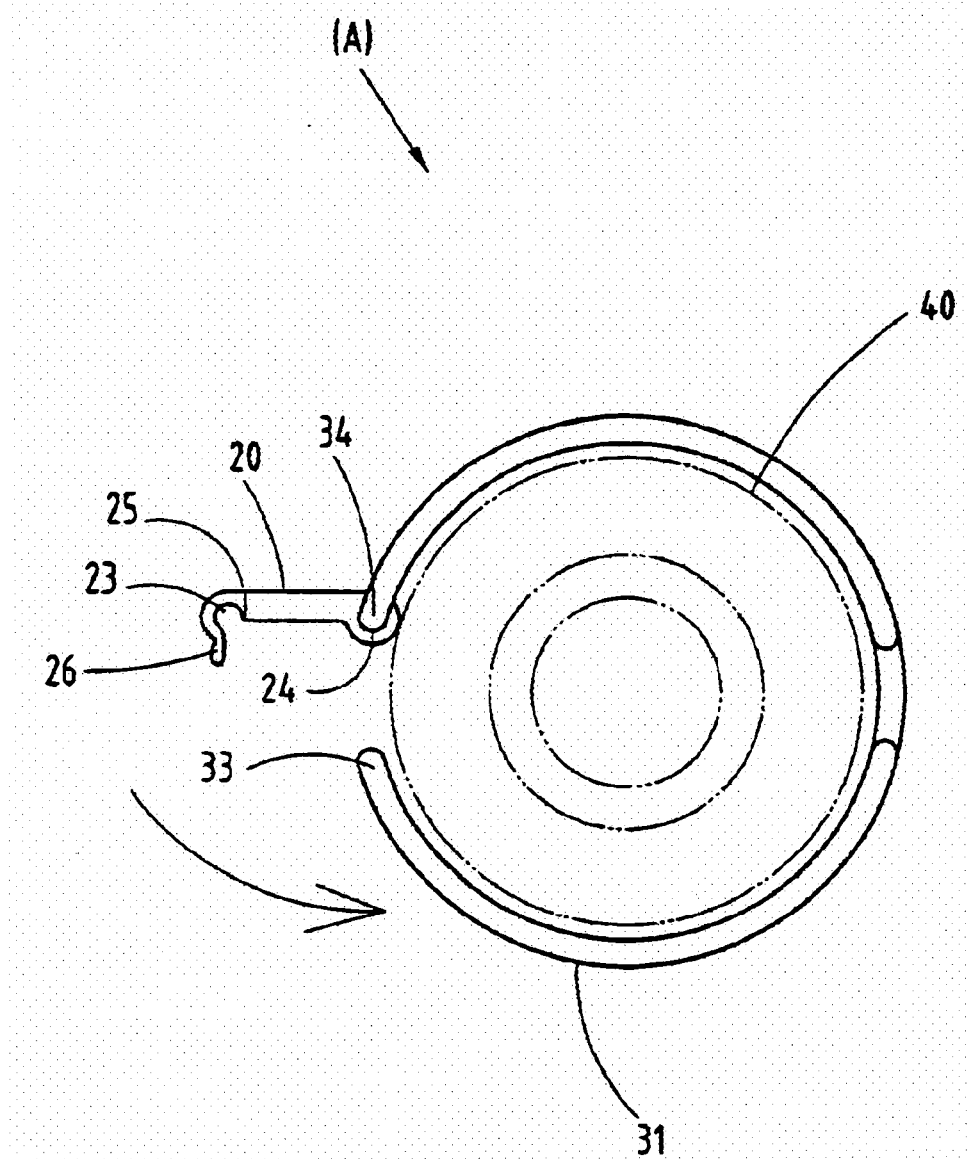
FIG. 7 shows another schematic view of the present invention action.

As illustrated in FIG. 6, when the container holder 30 is exerted on by an external force, the base 32 of the container holder 30 is separated from the retaining slot 29. As the first side portion 33 is forced to move past the retaining edge 26, the container hold 30 is turned to enable the beverage container 40 to be taken out of the confining portion 31.

The elastic element 28 is a coil spring.

I claim:

1. A frame mounted on a bicycle frame to hold a beverage container, said frame comprising:

a fastening seat comprised of a fastening hole and fastened to the bicycle frame by a fastening bolt via said fastening hole, said fastening seat further comprised of a first receiving slot and a second receiving slot, with said first receiving slot being comprised of an opening and a retaining edge extending along said opening, with said second receiving slot being comprised of a stop edge, an elastic element, and a retaining slot; and a container holder comprised of a confining portion, a base, a first side portion, and a second side portion whereby said container holder is mounted on said fastening seat such that said first side portion of said container holder is received in said first receiving slot of said fastening seat, and that said first side portion is retained by said retaining edge of said first receiving slot of said fastening seat, and that said base of said container holder is movably located in said retaining slot of said second receiving slot of said fastening seat whereby said confining portion of said container holder is used to confine the beverage container such that the beverage container can be taken out of said confining portion by exerting a force on said container holder, thereby resulting in separation of said base of said container holder from said retaining slot of said second receiving slot of said fastening seat and in movement of said first side portion of said container holder past said retaining edge of said first receiving slot of said fastening seat.

2. The frame as defined in claim 1, wherein said elastic element is a coil spring.

* * * * *